United States Patent [19]

Natori et al.

[11] Patent Number: 4,604,141

[45] Date of Patent: Aug. 5, 1986

[54] SLIP CASTING MOLD

[75] Inventors: Tatsuo Natori, Kashiwa; Hideo Nakae, Tokyo; Akihide Watanabe; Takashi Shimaguchi, both of Ibaraki, all of Japan

[73] Assignee: Hitachi, Ltd., Tokyo, Japan

[21] Appl. No.: 599,483

[22] Filed: Apr. 12, 1984

[30] Foreign Application Priority Data

Apr. 15, 1983 [JP] Japan .................................. 58-65372
Sep. 14, 1983 [JP] Japan .................................. 58-168120

[51] Int. Cl.[4] .............................................. B29C 33/00

[52] U.S. Cl. ................................ 106/38.35; 106/38.4; 106/112; 106/115; 249/62; 249/134

[58] Field of Search ........................ 264/317, 221, 337; 106/38.35, 109, 112, 113, 115, 38.23, 38.4, 38.5 R, 114; 249/134, 62

[56] References Cited

U.S. PATENT DOCUMENTS

| | | | |
|---|---|---|---|
| 764,849 | 7/1904 | Hubbard | 106/113 |
| 1,609,539 | 12/1926 | Espino | 106/113 |
| 1,658,605 | 2/1928 | Liebich | 106/113 |
| 1,901,057 | 3/1933 | Roos | 106/115 |
| 2,212,811 | 8/1940 | Hann | 106/112 |
| 2,303,303 | 11/1942 | Schleicher | 106/115 |
| 2,494,403 | 1/1950 | Nies et al. | 106/38.35 |
| 2,741,562 | 4/1956 | Haworth | 106/112 |
| 3,057,742 | 10/1962 | Cunningham | 106/115 |

FOREIGN PATENT DOCUMENTS 1482436 8/1977 United Kingdom .

*Primary Examiner*—Willard E. Hoag
*Attorney, Agent, or Firm*—Antonelli, Terry & Wands

[57] ABSTRACT

A slip casting mold consisting essentially of a gypsum mold, which contains a water-insoluble organic material, more particularly, a water-insoluble vegetable material such as cellulose, or which further contains glue in addition to the water-insoluble organic material. Since the strength of the casting mold is reduced markedly by heating, a cast article requiring a core (or master mold) having complex shape can be obtained extremely easily.

4 Claims, 5 Drawing Figures

SLIP CASTING MOLD

BACKGROUND OF THE INVENTION

1. Field of the Invention

This invention relates generally to a slip casting mold for use in obtaining a cast article by casting a slip containing refractory powder such as ceramic powder, metal powder, or carbon powder and more particularly to a slip casting mold suitable for use in obtaining a cast article which requires a core having such complex shape that it can not be withdrawn because it has an inverse gradient.

2. Description of the Prior Art

When a hollow cast article whose hollow portion has complex shape, or a cast article which requires a core having such complex shape that it can not be withdrawn because of its inverse gradient, is cast by slip casting, it has been difficult or impossible to remove the core by the use of a conventional gypsum mold.

As one of the prior art techniques relating to the present invention, mention can be made of British Pat. No. 1,482,436. [METHOD FOR MAKING AN ARTICLE BY SLIP CASTING].

According to this prior art, a casting mold for a portion having complex shape is produced using an organic material which is soluble in a solvent, while a gypsum mold is used for a portion having simple shape. These two molds are then assembled to obtain a desired casting mold.

However, this method does not take into consideration the possibility that a density difference will occur on a green body between the organic portion and the gypsum portion depending upon the shape and size of the resulting cast article and will somehow affect the strength reliability, dimensional accuracy and workability.

OBJECT OF THE INVENTION

Under these circumstances, an object of the present invention is to provide a slip casting mold which makes it easy to withdraw a core (or a master mold) even when a cast article having complex shape or a cast article which requires a core (or a master mold) having complex shape is to be prepared by slip casting.

SUMMARY OF THE INVENTION

The first aspect of this invention is a slip casting mold consisting of a gypsum mold characterized in that the gypsum mold contains a water-insoluble organic material.

The second aspect of this invention is a slip casting mold consisting essentially of a gypsum mold characterized in that it contains a material which can keep the water absorbing property of the gypsum mold or impart the water absorbing property to the gypsum mold and which can be burnt out at a temperature lower than whichever of the sintering temperature of a green body and that of the gypsum is lower to reduce the bindability of the mold.

In the first aspect of this invention described above, water-insoluble organic material is incorporated in the gypsum mold so that the bindability of the mold can be lost by heating the cast article (green body) after casting together with a core to burn the organic material, and the strength of the mold can be minimized as much as possible (close to zero). The organic material preferably has further water absorbability in addition to its water insolubility. Since it is water-insoluble, the organic material cannot be packed into gaps between the gypsum particles, so that the water absorbing property of the gypsum mold itself is not reduced. If the water absorbing property of the gypsum mold is reduced, consolidation of the slip after casting is retarded and in an extreme case, the mold can no longer be used as a casting mold.

Incidentally, the organic material can also impart collapsibility to the mold.

Preferred examples of the organic material which is water-insoluble and has the water absorbing property include vegetables such as cellulose (vegetable fibers) and grain powder. The cellulose is preferably added in the powder form, because the powder does not impede the fluidity of the slurry. Paper made of cellulose as the raw material can also be used. In this case, tissue papers are preferred because they possess both water insolubility and water absorbability. They are added and dispersed uniformly in the powder form to the gypsum slurry.

The amount of addition of the cellulose to the gypsum is preferably from 4 to 14 parts by weight of cellulose per 100 parts by weight of the gypsum. If the amount of cellulose is below 4 parts by weight, the residual compressive strength (hereinafter referred to as "residual strength") of the mold after heating becomes too great while if it exceeds 14 parts by weight, the initial compressive strength (compressive strength after drying at 80° C. for a predetermined period of time; hereinafter referred to as "initial strength") of the mold becomes too small (3 kgf/cm$^2$), and the mold is likely to be broken during handling. Polymers can also be used besides the vegetable materials.

In the present invention, the process from casting of the slip till sintering of the green body is carried out through the steps of casting of the slip→burning of the vegetable material in the mold (core) by heating→collapse and removal of the mold (core)→sintering of the green body. The heating temperature for burning the vegetable material is about 500° C. When the vegetable material is burnt out, the gypsum mold loses its bindability and can be easily broken by an external force of at most 1 kgf/cm$^2$. Accordingly, the external force may be caused by weakly compressed air or vacuum suction, and the collapse and removal of the gypsum mold can be simultaneously effected by using such an external force. After the gypsum mold is thus removed, an unsintered green body is left behind, and a finished cast article can be obtained by sintering the green body.

A small amount of glue (impure gelatin obtained, e.g., from animal organs by boiling with water, straining and drying) is further added to the gypsum mold in addition to the vegetable material such as cellulose, because the glue raises the initial strength of the mold and remarkably improves the collapsing property of the mold after heating.

The amount of the glue added is preferably from 0.05 to 2.0 parts by weight of glue per 100 parts by weight of the gypsum containing 2 to 20 parts by weight of cellulose.

If the amount of the glue is below 0.05 part by weight, the effect of addition can be hardly observed.

If the amount of the glue is above 2.0 parts by weight, the hardening time of the gypsum mold is remarkably retarded beyond a practical level.

For these reasons, the amount of the glue is suitably from 0.05 to 2.0 parts by weight per 100 parts by weight of the gypsum.

DETAILED DESCRIPTION OF THE INVENTION

Now, the present invention will be described in detail with reference to Examples thereof.

EXAMPLE 1

Either cellulose powder or tissue paper was added together with water to gypsum in the proportions shown in Table 1, and the mixture was kneaded at 200 r.p.m. for 5 minutes.

TABLE 1

| | (parts by weight) Sample No. | | |
|---|---|---|---|
| Additive | 1 | 2 | 3 |
| gypsum | 100 | 100 | 100 |
| cellulose powder* | — | 5 | — |
| tissue paper | — | — | 5 |
| water | 45 | 70 | 55 |

*90% passed through a 100-mesh screen

A mix gypsum with only water was also prepared for comparison with the above slurry.

Each of the resulting slurries for a mold was poured and packed into a wooden pattern for producing a testpiece ($\phi$50 mm×H 50 mm). After the testpiece was left standing for 24 hours, the wooden pattern was withdrawn, and then the testpiece was dried at 80° C. for 4 hours.

Figure 1:
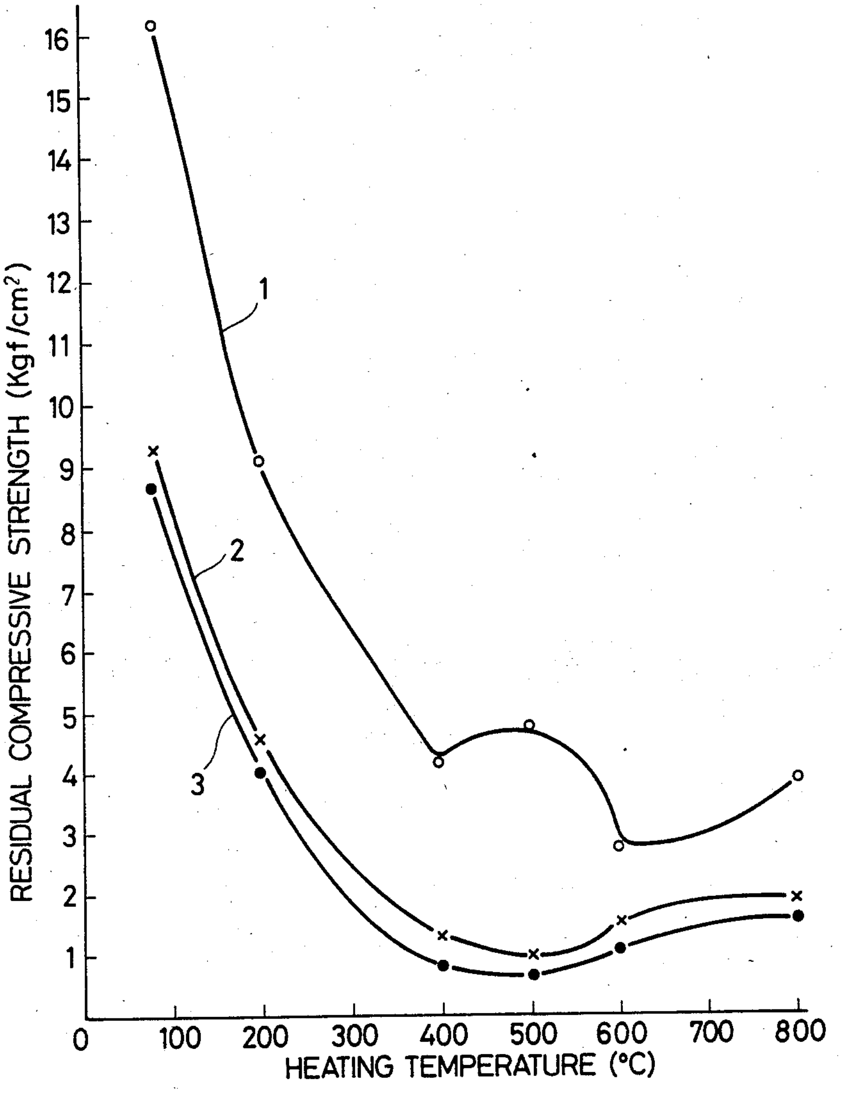
FIG. 1 is a diagram showing the relationship between the heating temperature and the residual strength in slip casting molds in accordance with both the present invention and the prior art.

Each testpiece was heated at various temperatures from 200° to 800° C. for 60 minutes in a muffle furnace and air cooled. The residual strength of the testpiece was measured at room temperature. The result is shown in FIG. 1. Curve 2 represents the sample to which 5 parts by weight of the cellulose powder was added, curve 3 represents the sample to which 5 parts by weight of the tissue paper was added, and curve 1 represents the gypsum mold to which no additive was added. As is obvious from the diagram, the residual strength of the molds to which 5 parts by weight of the cellulose powder was added and to which 5 parts by weight of the tissue paper was added, respectively, dropped to 1 kgf/cm$^2$ and 0.7 kgf/cm$^2$, respectively, after heating at 500° C. If the residual strength was reduced to these levels, the resulting molds could be easily collapsed and removed by weakly compressed air or vacuum suction. In contrast, the mold to which no additive had been added had a residual strength of as great as 4.8 kgf/cm$^2$, and its removal was extremely difficult. A forced removal would result in damage to the unsintered green body.

EXAMPLE 2

Cellulose powder and water were added to gypsum in the proportions shown in Table 2 and the mixture was kneaded at 200 r.p.m. for 5 minutes.

TABLE 2

| | (parts by weight) Sample No. | | | | |
|---|---|---|---|---|---|
| Additive | 1 | 2 | 3 | 4 | 5 |
| gypsum | 100 | 100 | 100 | 100 | 100 |
| cellulose powder* | 0 | 2 | 4 | 8 | 16 |
| water | 45 | 50 | 55 | 75 | 120 |

*90% passed through a 100-mesh screen

Figure 2:
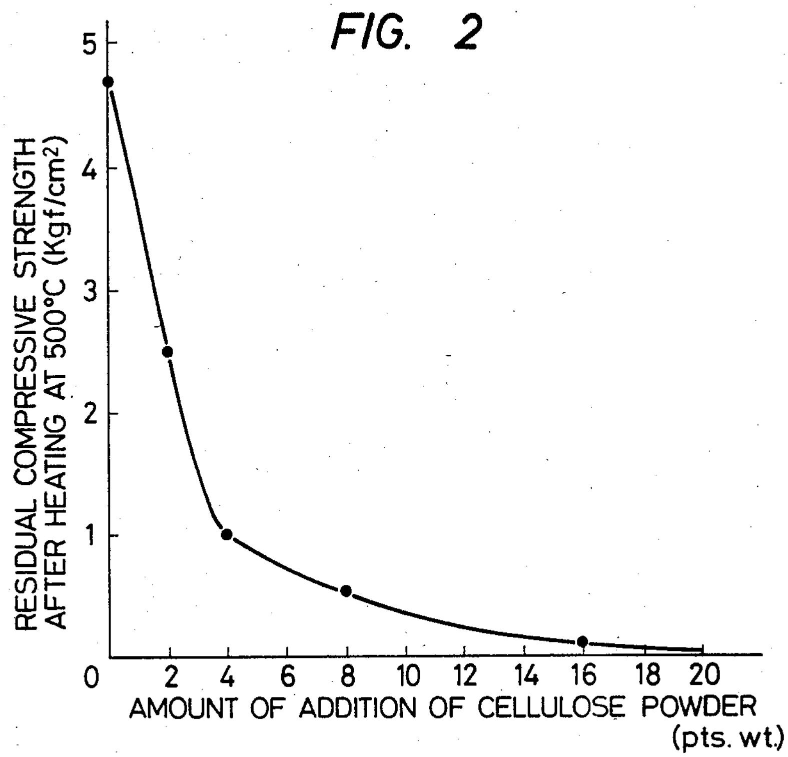
FIG. 2 is a diagram showing the relationship between the amount of addition of a cellulose flake and the residual strength after heating at 500° C. in the casting mold in accordance with the present invention.

Each testpiece was prepared in the same way as in Example 1 and, after being heated at 500° C. for 60 minutes, it was left standing in the air. The residual strength was measured for each testpiece. The result is shown in FIG. 2. As is obvious from this figure, the residual strength increased when the amount of the cellulose powder was below 4 parts by weight, and the collapsing property of the mold was decreased.

EXAMPLE 3

Figure 3:
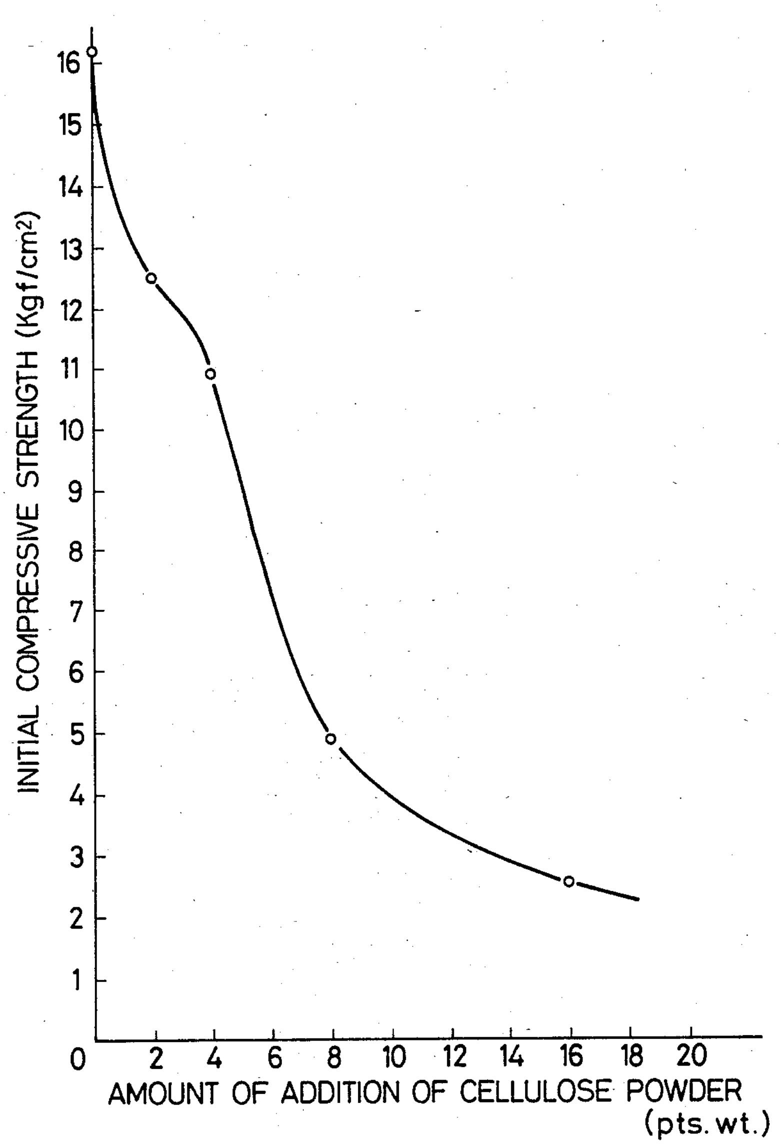
FIG. 3 is a diagram showing the relationship between the amount of addition of the cellulose flake and the initial strength in the casting mold of the present invention.

Each testpiece was prepared in the same way as in Example 2 and the initial strength (compressive strength after heating at 80° C. for 4 hours) was measured for each testpiece. As is obvious from FIG. 3, the initial strength dropped below 3 kgf/cm$^2$ when the amount of the cellulose powder was above 14 parts by weight, so that breakage of the mold was likely to occur during slip casting and its handling became difficult.

EXAMPLE 4

Five parts by weight of tissue paper was added to 75 parts by weight of water and the aqueous mixture was kneaded at 300 r.p.m. for 5 minutes to cut the paper fiber. While the mixture was being stirred, 100 parts by weight of gypsum was added and the mixture was kneaded for 5 minutes to prepare a mold slurry. The resulting slurry was poured and packed into a wooden pattern to obtain a core for use in molding a rotor casing. After the molding, the core was dried at 80° C. for 2 hours to obtain a spiral gypsum core. This core was placed in a master mold that was separately molded, so as to assemble a casting mold.

Next, 20 parts by weight of water, 0.2 part by weight of an activator, and 0.1 part by weight of citric acid were added to 100 parts by weight of alumina powder having an average particle size of 2.5 μm, and the mixture was kneaded by a ball mill for 24 hours to prepare an alumina slip. This slip was poured and packed into the casting mold assembled in the manner described above and, after it was left standing for 4 hours, only the master mold was withdrawn. The green body and the core were then heated at 100° C. for 2 hours. After heating was continued at 500° C. for 3 hours, they were left standing in the air for cooling. The resulting spiral core could be completely collapsed and removed by compressed air of 0.8 kg/cm$^2$, and only the alumina green body was left behind. Thereafter, the green body was placed into a furnace, and the furnace temperature was gradually raised from normal temperature to sinter the green body at 1,600° C. for 4 hours, providing a perfect alumina rotor casing.

EXAMPLE 5

Eight parts by weight of cellulose powder and 100 parts by weight of gypsum were added to 75 parts by weight of water and a slurry for a casting mold was prepared in the same way as in Example 4. A rotor prototype of silicone rubber, that was produced separately, was placed at the center of a given wooden flask and the slurry described above was poured and packed into the wooden flask. It was then placed in a vacuum pressure chamber (10 Torr) and was kept there for 2 minutes to remove any air bubbles. After the mold consolidated, the prototype was withdrawn, and the rotor casting mold (unitary mold) was dried at 80° C. for 2 hours. An alumina slip that was prepared in the same way as in Example 4 was poured and packed into this casting mold and was left standing for 8 hours, followed by heating at 500° C. for 3 hours. After being cooled in the air, the casting mold was removed by vacuum suction. The resulting green body was gradually heated in the same way as in Example 4 and was sintered at 1,550° C. for 5 hours to provide a perfect alumina rotor.

EXAMPLE 6

Cellulose powder, glue and water were added to gypsum in the proportions shown in Table 3 and the mixture was kneaded at 200 r.p.m. for 5 minutes.

TABLE 3

| Additive | (parts by weight) Sample No. 1 | 2 |
|---|---|---|
| gypsum | 100 | 100 |
| cellulose powder* | 8 | 8 |
| glue | 0 | 0.2 |
| water | 75 | 75 |

*90% passed through a 100-mesh screen

Each of the resulting slurries for a mold was poured and packed into a wooden pattern for producing a testpiece ($\phi$50 mm$\times$H 50 mm). After the testpiece was left standing for 24 hours, the wooden pattern was withdrawn, and then the testpiece was dried at 80° C. for 4 hours. After heating, the testpiece was cooled in the air, its residual strength was measured at room temperature. The result is shown in FIG. 4.

Figure 4:
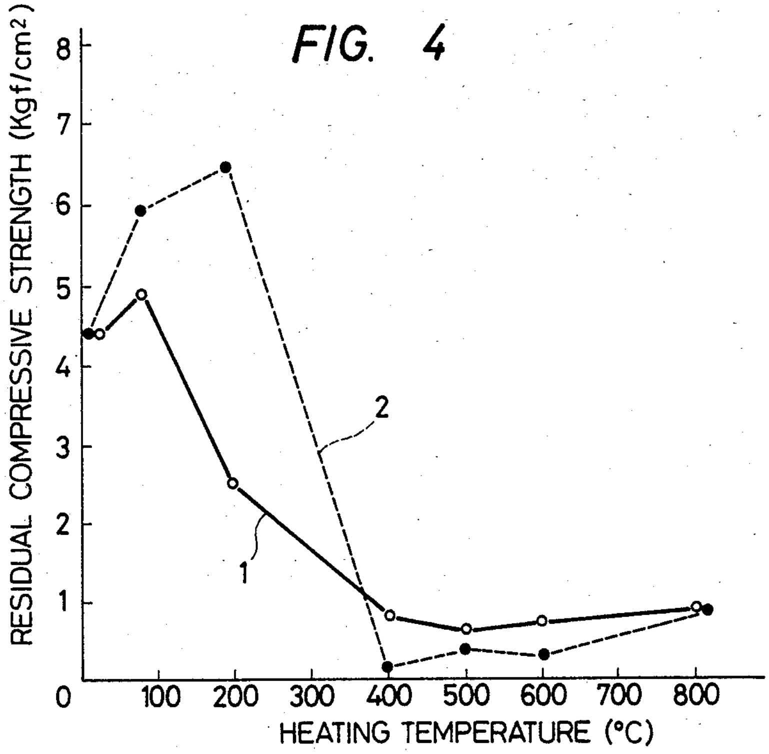
FIG. 4 is a diagram showing the relationship between the heating temperature and the residual compressive strength in the casting mold of the present invention.

FIG. 4 is a diagram showing the relationship between the heating temperature and the residual strength for the casting mold. The abscissa represents the heating temperature (°C.$\times$60 minutes) and the ordinate represents the residual strength (kgf/cm$^2$). Curve 1 in the diagram refers to the sample to which no glue was added and curve 2 to the sample to which 0.2 parts by weight of glue had been added.

As can be understood clearly from this diagram, the initial strength (strength after heating at 80° C. for 4 hours) could be improved by 20% by the addition of the glue, although the green strength was exactly the same. In contrast, the residual strength after heating to at least 400° C. became lower than that of the sample to which no glue had been added. At 400° C., for example, the residual strength of the sample to which no glue had been added was about 1 kgf/cm$^2$, whereas the residual strength of the sample to which 0.2 parts by weight of the glue had been added dropped to 0.2 kgf/cm$^2$ which was indeed 1/5 of the former.

It can thus be understood that when the glue is added, the collapse and removal of the core for the slip casting mold becomes extremely easier than when no glue is added.

EXAMPLE 7

Cellulose powder, glue and water were added to gypsum in the proportions shown in Table 4 and the mixture was kneaded at 200 r.p.m. for 5 minutes.

TABLE 4

| Additive | Sample No. 1 | 2 | 3 | 4 | 5 | 6 |
|---|---|---|---|---|---|---|
| gypsum | 100 | 100 | 100 | 100 | 100 | 100 |
| glue | 0 | 0.2 | 0.4 | 0.8 | 1.6 | 2.0 |
| cellulose powder (*) | 8 | 8 | 8 | 8 | 8 | 8 |
| water | 75 | 75 | 75 | 75 | 75 | 75 |

*90% passed through a 100-mesh screen

Testpieces were produced in the same way as in Example 6. After the testpiece was left standing for 24 hours, the wooden pattern was withdrawn, and then the testpiece was dried at 80° C. for 4 hours.

Figure 5:
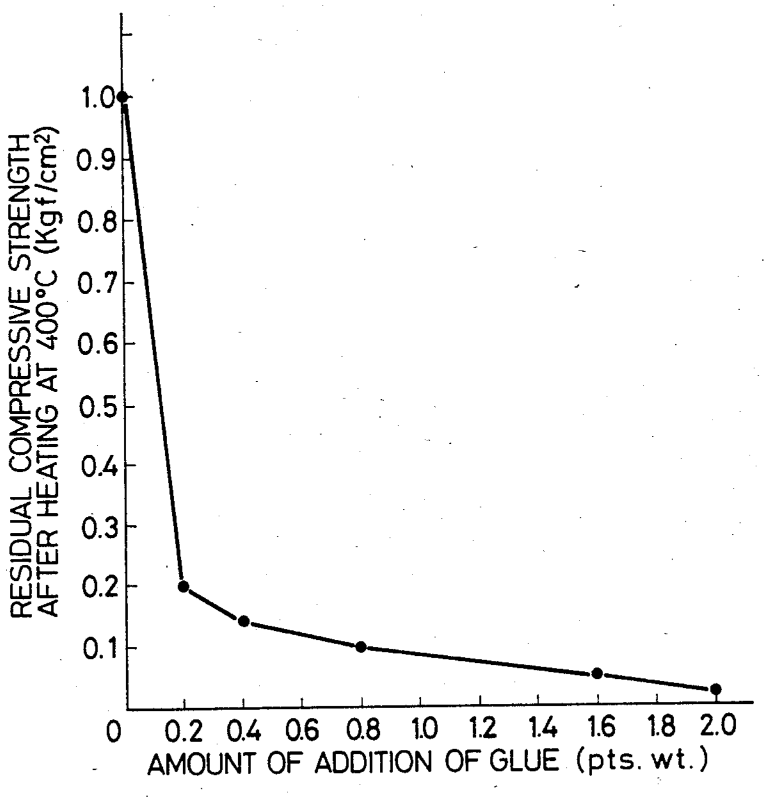
FIG. 5 is a diagram showing the relationship between the amount of addition of glue and the residual compressive strength in the casting mold of the present invention.

Each testpiece was heated at 400° C. for 60 minutes in a muffle furnace and air cooled. The residual strength of each testpiece was measured at room temperature. The result is shown in FIG. 5.

As is obvious from the diagram, the residual strength dropped to 1/5 or below when the amount of the glue exceeded 0.2 parts by weight in comparison with the case where no glue had been added.

As described above, since the casting mold in accordance with the present invention contains a water-insoluble organic material, the organic material is burnt out by heating to remarkably reduce the strength of the casting mold, so that a hollow cast article requiring a core having such complex shape that it can not be withdrawn because of its inverse gradient, can be obtained extremely easily.

If the casting mold of the present invention is applied as a master mold, it is no longer necessary to split the master mold. For this reason, there can be obtained additionally the effects that a cast article having a high dimensional accuracy can be obtained, and since collapsibility is imparted to the casting mold, the casting mold can be obtained easily. The addition of the glue further improves the effects described above.

What is claimed is:

1. A slip casting mold consisting essentially of a gypsum mold, wherein said gypsum mold contains 2 to 20 parts by weight of a water-insoluble and water-absorbing vegetable cellulose and 0.05 to 2.00 parts by weight of impure gelatin, per 100 parts by weight of gypsum, whereby addition of the impure gelatin to the mold containing a water-insoluble and water-absorbing vegetable cellulose raises the initial strength of the mold while improving the collapsing property of the mold after heating at a temperature of at least 400° C.

2. A slip casting mold as defined in claim 1 wherein said vegetable cellulose is paper.

3. A slip casting mold as defined in claim 1 wherein the water-insoluble and water-absorbing vegetable cellulose is in the form of a powder.

4. A slip casting mold as defined in claim 1 wherein 0.2 to 2.00 parts by weight of impure gelatin are contained in the gypsum mold.

* * * * *